United States Patent [19]

Ineson et al.

[11] 4,132,367
[45] Jan. 2, 1979

[54] CORD WINDER

[75] Inventors: Norman Ineson, Barrie; Stuart M. Dickinson, London; Charles E. Livingstone, Greely, all of Canada

[73] Assignee: Indicel Co., Ltd., Ontario, Canada

[21] Appl. No.: 828,961

[22] Filed: Aug. 29, 1977

[30] Foreign Application Priority Data

Jan. 4, 1977 [CA] Canada .................................. 269059

[51] Int. Cl.² ........................................... B65H 51/08
[52] U.S. Cl. .................................. 242/47.1; 242/47.11
[58] Field of Search .................... 242/47, 47.08–47.11, 242/54 R, 107 R; 74/750 R, 797, 801, 802

[56] References Cited

U.S. PATENT DOCUMENTS

| 1,847,161 | 3/1932 | Alden | 242/47.11 |
| 2,606,358 | 8/1952 | Furness | 242/47.1 |
| 2,609,587 | 9/1952 | Kuljian | 242/47.1 |
| 3,617,659 | 11/1971 | Freeman | 242/107 R |

FOREIGN PATENT DOCUMENTS 222773 10/1942 Switzerland .......................... 242/47.11

*Primary Examiner*—Leonard D. Christian
*Attorney, Agent, or Firm*—Charles P. Boukus, Jr.

[57] ABSTRACT

A cord winder featuring a number of rotating planetary drums which orbit about a fixed sun drum can be used as a collection and pay-out structure for cord, strands, rope and the like. Orbiting of the planetary drums is assured by a crank or spring motor. During this orbiting the planetary drums are imparted to rotate about their respective axis and simultaneously layer the strand on the sun drum.

12 Claims, 13 Drawing Figures

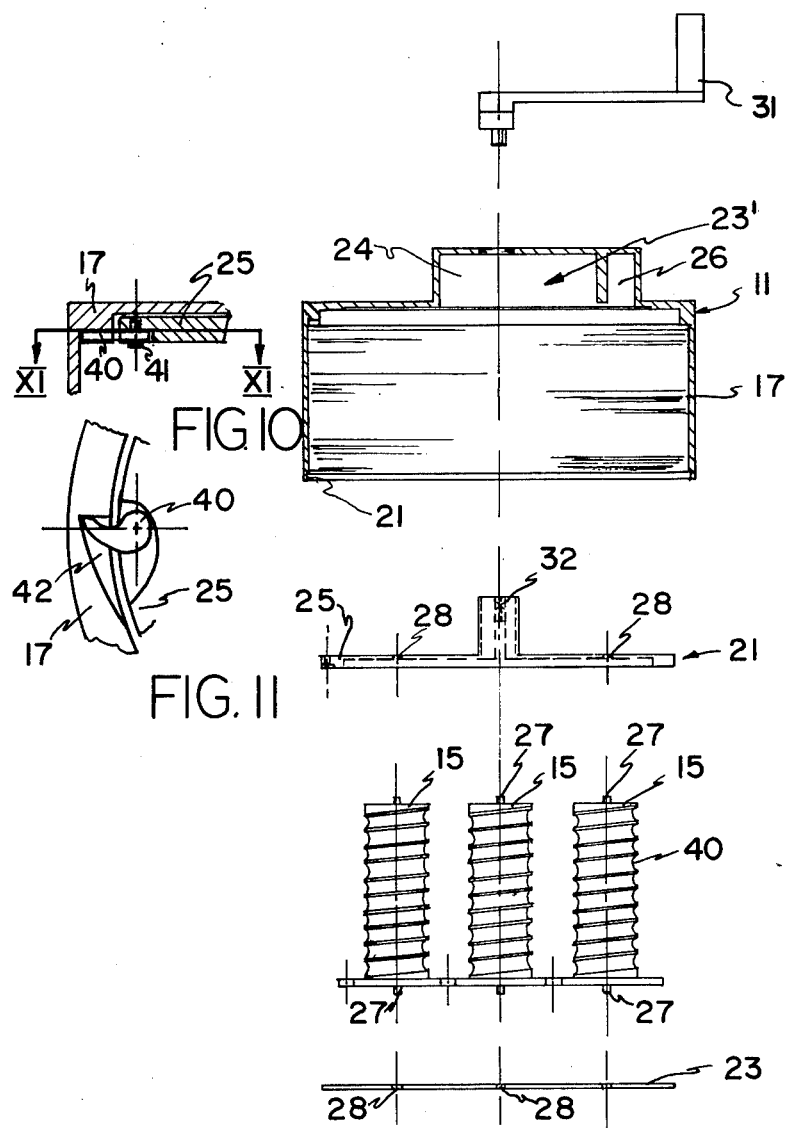
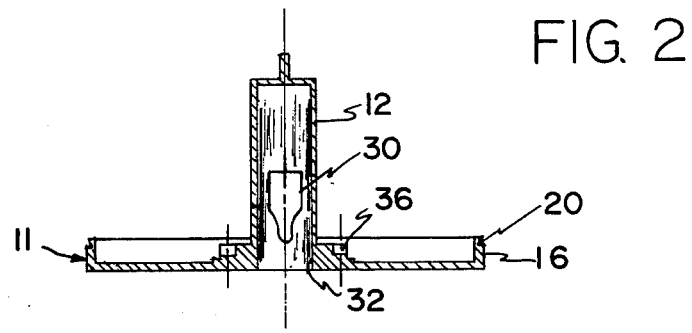

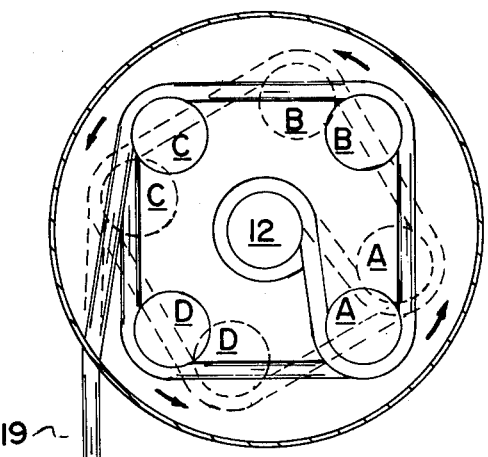
FIG. 3
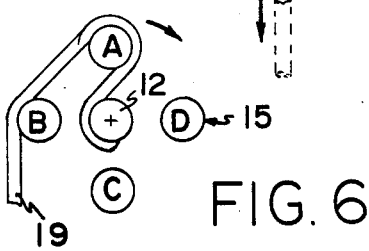
FIG. 6
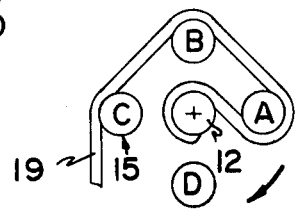
FIG. 7
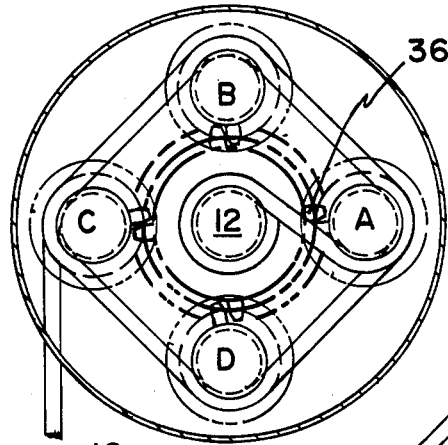
FIG. 8
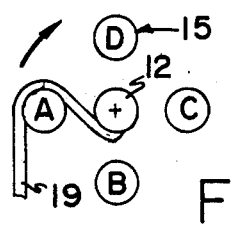
FIG. 5
FIG. 4

CORD WINDER

This invention relates to a cord winder and particularly to a winder for ropes, power cords and the like.

The prior art is repleat with retractable strand or cord winders which permit pay-out of the strand and retraction of the strand from the winder either by way of crank or under the influence of a power source.

The prior art discloses power sources with spring motors, electric motors and the like; but the coiling of the cord into full retraction whether with or without power source, is usually achieved by ultimately coiling the cord about a single drum. In some instances the drum is stationary and in other instances it rotates for the purposes of winding and unwinding the strand so as to permit pay-out or retraction. In almost all cases slip rings are used when the winder is used as the instrument for winding or paying out power cord. The slip rings convey the electrical contacts from moving components to nonmoving components of the winder.

Cord winders suffer from their complex structures and this makes it difficult to mold the component parts easily and cheaply so that a "stand-alone" cord winder can be competitive in the market place.

It is for this reason coil winders have found a limited application in the market place as "stand-alone" units while they have achieved a moderate success when included as power cord winder components to a portable applicances such as lawn mowers, vacuum cleaners, polishers and the like.

The use of slip rings in other prior art winders limits their application for use with power cords to non-hazardous environments, ie non-corrosive, or where their is no possibility of explosion being set off by a spark on the slip rings or shorting as by moisture on water.

It has been conceived that a cord winder featuring a number of rotating planetary drums which orbit around a fixed sun drum can be used as a collection and pay-out structure for a cord winder and that a crank or spring motor may be employed as the device for driving the drums in orbit and rotation about the sun drum for either cord pickup or pay-out.

This structure avoids the use of slip rings in power cord applications. Thus the winder can be used in explosive, caustic, and moisture laden environments without fear or risk of shorting or spark generation by the workings of the winder.

The invention thus achieves a winder for storing, pay-out, and collecting cord, cable and the like, the winder comprising:

(a) a number of rotatable planetary drums adapted to orbit about a sun drum, (b) a strand having one end attached to the sun drum and travelling over each of the planetary drums; and, (c) means for causing orbiting and rotation of the planetary drums, about the sun drum such that in one direction the strand migrates over the planetary drums and winds onto the sun drum, while in the other direction the strand pays out off the sun drum and travels in the opposite direction over the planetary drums.

The invention also conceives that the planetary drums have means for conveying onto or off of the sun drum the strand in a regulated manner, and that the sun drum is fixed.

The invention will now be described by way of example and reference to the accompanying drawings in which:

FIG. 2 is an assembly view, partially in section of the winder of FIG. 1.

FIG. 3 is a respesentative side sectional view of the planetary and sun drums during pay-out of the strand.

FIG. 4 is the same perspective sectional view as in FIG. 3, illustrating means by which the planetary drums are caused to rotate about their axis.

FIGS. 5 through 8 are explanatory diagrams showing the mode by which the strand is wound to travel over the planetary drums and to wind onto the sun drum.

FIG 10 is a fragmented sectional view of the frame and housing interface showing a pawl (it is located on the sheet of drawings with FIGS. 3 through 8).

FIG. 11 is a sectional view along lines XI — XI of FIG. 10 (it is also located on the sheet of drawings with FIGS. 3 through 8).

Figure 1:
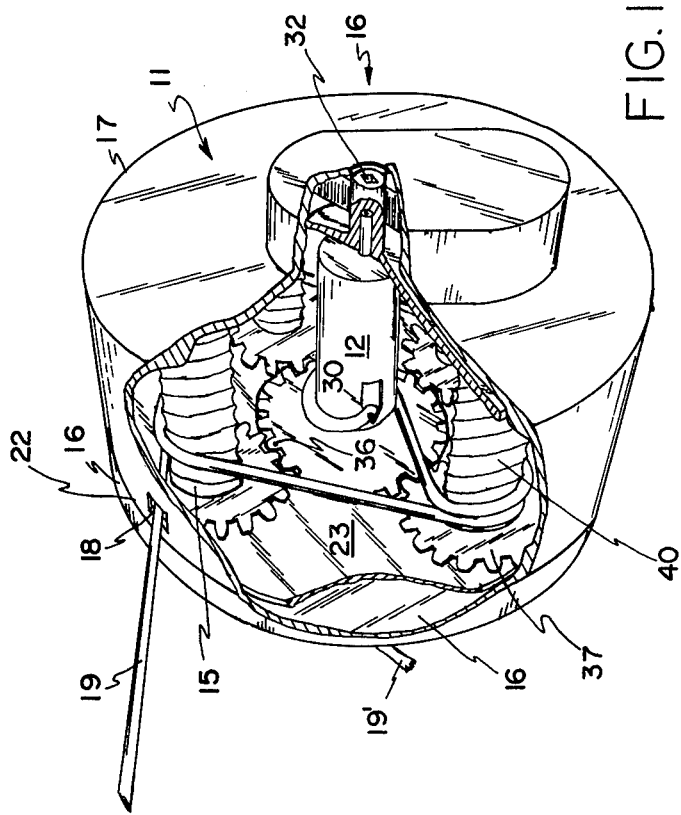
FIG. 1 is a perspective view, partially in section, of a winder according to the invention.
Figure 9:
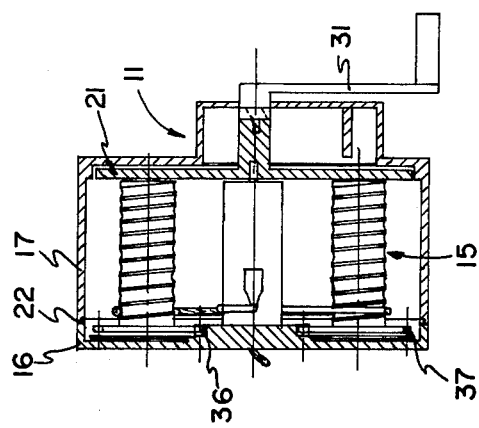
FIG. 9 is an elevation view of the embodiment partially in section, with crank (it is located on the sheet of drawings with FIG. 1).

Referring to FIG. 1 a winder includes a housing 11 and a sun drum 12 fixed relative to the housing and four planetary drums generally shown as 15, which are adapted to orbit about the sun drum 12, while also adapted to rotate about their respective axis. Individual drums 15 are respectively indicated as A, B, C and D.

The housing 11 includes a lower mold plate or base 16 which has as its centre a hollow protrusion which forms the sun drum 12. An upper cover 17, which defines a strand accommodating orifice, through which a strand 19 such as cord, twine and the like may pass, completes the housing.

The lower margin of the upper cover 17 and the upper margin of the base 16 have reversingly molded lips 20 and 21 which respectively mate to form the seam 22 and hold the housing together.

The upper portion of the upper cover 17 has a surmounting chamber 23' divided into two parts 24 and 26. Within this chamber may be mounted a conventional spring motor (FIGS. 12 and 13) which powers winding of the cord as will be hereafter described.

The strand 19 extends over each of the planetary drums 15 to wind about the sun drum 12 and its end is affixed to the sun drum by means of a tear drop orifice 30 so that the free end 19' of the strand 10 extends through that orifice 30 into the hollow sun drum and out beyond the housing 11 as a free end 19'. If the strand 19 is a power cord, the free end 19' makes connection with a power switch (not shown) on the appliance onto which the cord winder is affixed.

The orbiting of the planetary drums 15 about the sun drum 12 is assured by mounting of the planetary drums in an orbiting frame 21. The frame 21 comprises a lower annulus 23, which nests into the base 16, so to permit the protruding sun drum through it. An upper plate 25 completes the frame 21. The planetary drums 15 are equipped with protruding axes 27 top and bottom which mate into sockets 28 arranged in the upper plate 25 and annulus 23. Each planetary drum has flat upper and lower bearing surfaces and is positioned at a quadrant in the frame 21. They are secured between the upper plate 25 and the lower annulus 23 by means of the interlocking reversing lips 20 and 21 of the housing components. The wide bearing surfaces at the ends of each satellite drum 15 act as stabilizing plates against the upper plate 25 and annulus 23. Now in order to insure that the planetary drums rotate about their respective axes 27 as the frame 21 is caused to be rotated about the sun drum 12 as for example by a crank 31 which is adapted to extend through the cover 17 of the housing 11 into a socket 32 integral to the upper plate 21, a protrusion on the base of the housing plate 11 is provided with circumscribing teeth to form a gear 36 at the base of the sun drum 12. Each of the rotating planetary drums 15 has at its lower extremity, a corresponding gear 37 with teeth which engage and mate with the sun drum gear 36. As the frame 21 rotates about the fixed sun drum, the intermeshing of the respective teeth between the sun drum and planetary drums imparts rotation to the satellite drums. The rotation of the planetary drums is in unison about their respective axis as the planetary drums orbit about the sun drum. Other means can be used to impart rotation of the satellites as they orbit the sun.

In order to insure juxtaposed layering of each revolution of the strand 19, onto the sun drum, in an even and like manner, on each complete cycle or orbit of the frame 21, the satellite drums are provided with a helical channel profile 40 which tracks the strand, during each revolution of the satellite frame 21 about the sun drum 12 by one strand diameter along the sun drum 12 for each orbit, so that uniform juxtaposed layering of the strand on the drum is achieved. When the first full layer of strand has been wound on the sun drum, the capacity of the winder has been exhausted.

When a spring motor is used it is housed in the chamber 23. It urges the frame 21 into that position which will fully wind the cord 19 onto the sun drum 12. On the margins of the upper plate 25 are mounted a pawl 40 which pivots on a pin 41 mounted into the margin of the plate 25. The upper cover 17 has a mating recess 42 for receiving the pawl. When the frame 21 is in alignment the pawl will normally register with the recess 42 and constrain the frame 21 in a given position. In this way any length of cord may be fixedly payed out and held there over the urging force of the spring motor which tends to wind its frame 21 so as to recover all spent cord back onto the sun drum. When the frame 21 is orbited quickly in either direction the pawl fails to engage the recess and pay-out or winding is achieved.

Figure 13:
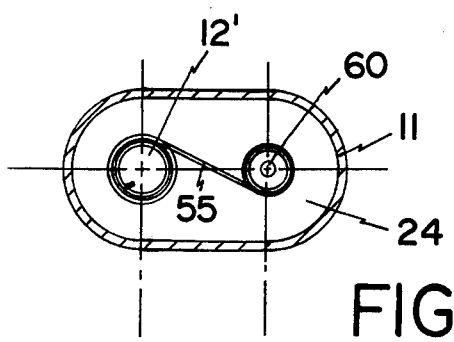
FIG. 13 is a plan view, partially in section, of the spring motor of FIG. 12.
Figure 12:
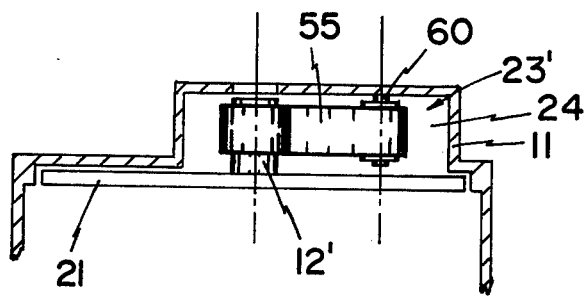
FIG. 12 is an elevation view of the embodiment, partially in section, incorporating a spring motor.

Referring to FIG. 12 an elevational view exploded shows a spring motor which consists in part of the sun drum extending into a shaft or drive drum 12' provided with a slot, as seen in FIG. 13, into which one end of a coiled leaf spring 55 engages. The other end of the coil spring 55 is affixed to a storage drum 60 integral with the upper portion of housing 11. The natural condition of the spring 55 is to be coiled around the storage drum 60. This will be the condition when the cord is fully wound, except that a part of the coil 55 will remain wound around the drive drum shaft 12'. As the cord is withdrawn the spring 55 is back wound bending it against its natural curvature unto the drive drum 12', thus providing a torque for rewinding of the cord 19.

The embodiments of the invention in which an exclusive property or privilege as claimed is defined as follows:

1. A winder for storing, pay-out, and collecting cord, cable and the like, the winder comprising:
   (a) a sun drum,
   (b) a number of rotatable planetary drums adapted to orbit about said sun drum,
   (c) a strand having one end attached to the sun drum and travelling over each of the planetary drums; and,
   (d) means for causing orbiting and rotation of the planetary drums about the sun drum such that in one direction the strand migrates over the planetary drums and winds onto the sun drum, while in the other direction the strand pays out off the sun drum and travels in the opposite direction over the planetary drums.

2. The winder as claimed in claim 1 including a housing which defines at its centre a hollow protrusion as the sun drum, the protrusion defining, an aperature, which communicates the interior of the housing with the exterior thereof and wherein the strand is attached to the protrusion at the aperature and extends through the aperature into the hollow protrusion and out beyond the housing.

3. The winder as claimed in claim 2 wherein the aperature is formed into a tear drop shape and the strand is engaged by the tear drop shape to thus hold the strand to the sun drum.

4. The winder as claimed in claim 2 wherein the planetary drums are held in relative position by a frame which is mounted to freely orbit, inside the housing, about the sun drum, and the relative proximity of the frame and housing engages the relative position of the planetary drums with the frame, while permitting free orbiting of the frame, and hence of the planetary drums about the sun drum.

5. The winder as claimed in claim 2 wherein each orbiting planetary drum has an axis of rotation and is rotatably mounted in the frame, which is mounted inside the housing and adapted to freely orbit about the sun, while the planetary drums are held in relative position by the relative proximity of said frame and said housing, the planetary drums orbiting about the sun drum with the frame while rotating about their respective axis.

6. The winder as claimed in claim 2 wherein there are four orbiting planetary drums and each has an axis of rotation and is pivotally mounted in a quandrant in the frame, which is mounted inside the housing and adapted to freely orbit about the sun drum, while the planetary drums are held in relative position by the relative proximity of the frame and housing, the planetary drums orbiting about the sun drum in unison with the frame while rotatable about their respective axis.

7. The winder as claimed in claim 1, wherein means for rotating the planetary drums includes an engaging surface on the sun drum and on each of the planetary drums, and wherein the engaging surface of the sun drum engages each of the engaging surfaces of the planetary drums such that during orbiting of the frame frictional forces between the engaging surfaces impart rotation about their respective axis to the planetary drums.

8. The winder as claimed in claim 1, wherein means for rotating the planetary drum includes a gear affixed to the sun drum and to each of the planetary drums, and wherein the sun gear engages each of the planetary gears such that during orbiting of the frame the intermeshing of gears imparts rotation to the planetary drums about their respective axis.

9. The winder as claimed in claim 1, wherein means for rotating the planetary drum includes an engaging surface on the sun drum and on each of the planetary drums, and wherein the engaging surface of the sun drum engages each engaging surface of the planetary drums such that during orbiting of the frame frictional forces between the relative engaging surfaces impart rotation about their respective axis to the planetary drums and further including a receptacle means in the frame and a crank adapted to extend through the housing and to engage the receptacle means whereby turning of the crank relative to the housing causes the frame to orbit about the sun drum.

10. The winder is claimed in claim 1, wherein means for rotating the planetary drum includes an engaging surface on the sun drum and on each of the planetary drums, and the engaging surface of the sun drum engages each engaging surface of the planetary drum such that during orbit of the frame frictional forces between the relative engaging surfaces impart rotation about their respective axis to the planetary drums and further including a spring motor relatively positioned between said frame and said housing and adapted to urge the frame into orbit about the sun drum.

11. The winder as claimed in claim 1, wherein means for rotating the planetary drums includes an engaging surface on the sun drum and on each of the planetary drums, and the engaging surface of the sun drum engages each engaging surface of the planetary drums such that during orbiting of the frame frictional forces between the relative engaging surfaces impart rotation about their respective axis to the planetary drums and further including a spring motor relatively positioned between frame and housing and adapted to urge the frame into orbit about the sun drum, and recess means in the said housing and pawl means attached to the said frame, whereby the pawl means are adapted to periodically engage in the recess means and thereby constrain sustained orbiting of the frame relative to the housing by the spring motor.

12. The winder as claimed in claim 1, wherein means for rotating the planetary drum includes an engaging surface on the sun drum and on each of the planetary drums, and the engaging surface of the sun drum engages each engaging surface of the planetary drums such that during orbiting of the frame frictional forces between the relative engaging surfaces impart rotation about their respective axis to the planetary drums and further including means on each planetary drum means for layering the strand in a layering fashion either onto or off of the sun drum in response to the direction of orbit of the satellite drums about the sun drum.

* * * * *